(12) United States Patent
Banker

(10) Patent No.: US 7,093,934 B1
(45) Date of Patent: Aug. 22, 2006

(54) SUNGLASSES FOR FITTING OVER PRESCRIPTION EYEWEAR

(75) Inventor: Matthew T. Banker, Daytona Beach, FL (US)

(73) Assignee: StyleMark, Inc., Ormond Beach, FL (US)

( * ) Notice: Subject to any disclaimer, the term of this patent is extended or adjusted under 35 U.S.C. 154(b) by 350 days.

(21) Appl. No.: 10/320,257

(22) Filed: Dec. 16, 2002

(51) Int. Cl.
*G02C 9/00* (2006.01)

(52) U.S. Cl. .......................................... 351/47; 351/57

(58) Field of Classification Search .................. 351/47, 351/57, 48, 58, 44, 41
See application file for complete search history.

(56) References Cited

U.S. PATENT DOCUMENTS

| | | | |
|---|---|---|---|
| 4,952,043 A * | 8/1990 | Werner et al. ................. 351/47 |
| 5,229,796 A * | 7/1993 | Nitta ........................... 351/130 |
| D407,566 S | 4/1999 | Lane |
| D408,840 S | 4/1999 | Lane |
| D416,933 S | 11/1999 | Lane |
| D417,461 S | 12/1999 | Lane |
| D418,534 S | 1/2000 | Lane |
| D419,585 S | 1/2000 | Lane |
| D433,698 S | 11/2000 | Lane |
| D434,062 S | 11/2000 | Lane |
| D434,063 S | 11/2000 | Lane |
| D434,789 S | 12/2000 | Lane |
| D435,579 S | 12/2000 | Lane |
| 6,231,178 B1 * | 5/2001 | Greaves ....................... 351/44 |
| D447,507 S | 9/2001 | Lane |
| D448,399 S | 9/2001 | Lane |

* cited by examiner

*Primary Examiner*—Hung Xuan Dang
(74) *Attorney, Agent, or Firm*—Allen, Dyer, Doppelt, Milbrath & Gilchrist, P.A.

(57) ABSTRACT

A construction for sunglasses adapted to be fitted over prescription eyewear having conventional nose pads and eyeglass temples comprises a lens frame having lens rims with corresponding lenses supported therein, a bridge between the lens rims and right and left temples extending rearwardly from corresponding pivots with the lens frame. The lens frame is free of any rearwardly-extending panels along the lower portion of the lens rims in order to avoid interference with the prescription eyewear, the bridge is designed with a nose-encircling edge permitting the sunglasses-prescription eyewear combination to be supported by the nose-pads of the eyewear, and the temples of the sunglasses include concavities adapted to receive the temples of the prescription eyewear, all to insure a more comfortable fit of the sunglasses over the prescription eyewear.

14 Claims, 7 Drawing Sheets

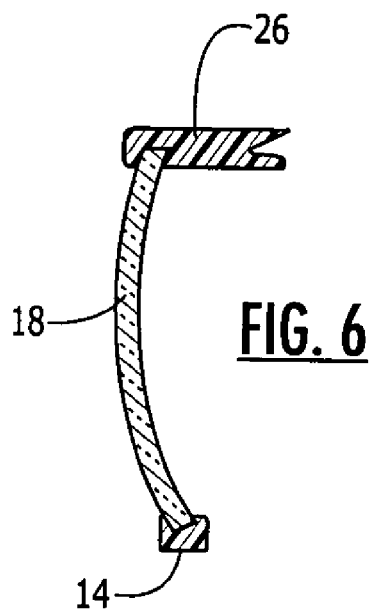
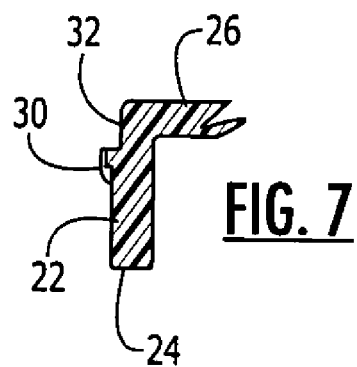
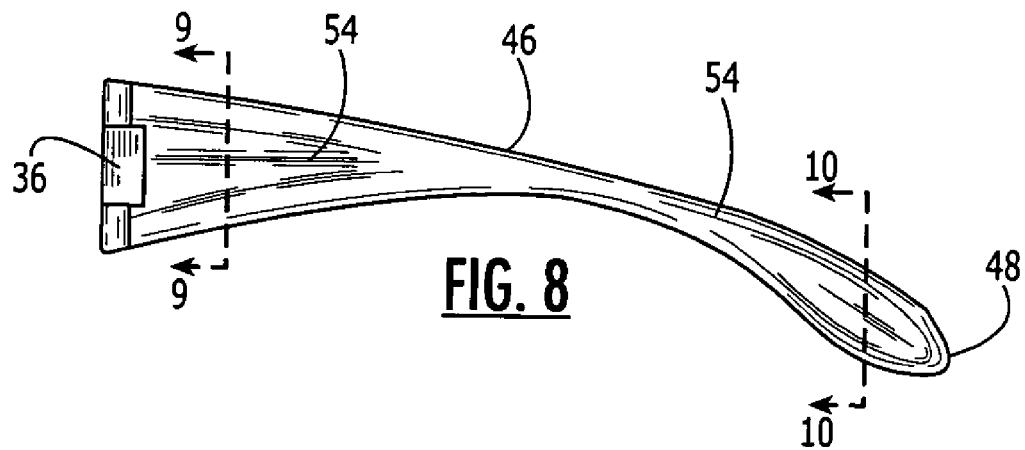
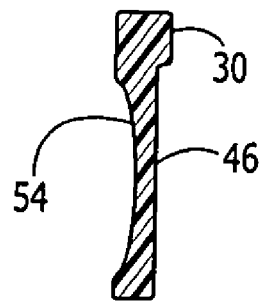
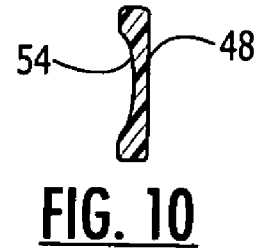

SUNGLASSES FOR FITTING OVER PRESCRIPTION EYEWEAR

BACKGROUND OF THE INVENTION

1. Field of the Invention

The present invention is directed to designs and constructions for sunglasses, and specifically to such designs and constructions which permit the sunglasses to be fitted over prescription eyewear when in use.

2. Description of the Prior Art

There are a number of designs and constructions for eyewear which are intended to protect the user from light glare and ultraviolet radiation caused by the sun. It is of course well known to tint the lens of prescription eyewear for use as sunglasses; it is also well known to adapt the construction of the sunglasses so as to fit over a pair of untinted prescription eyeglasses.

SUMMARY OF THE INVENTION

The present invention is directed to a novel design and construction for sunglasses which are particularly adapted to be fitted over the wearer's existing prescription eyeglasses of the type having conventional nose-pad means and eyeglass temples. The sunglasses construction comprises a lens frame having opposing front and rear faces and right and left lens rims each defining respective lens openings, with right and left lens each supported by the corresponding lens rim in the respective opening. The lens frame further includes a bridge between upper portions of the lens rims and a nose-encircling edge below the bridge. The lens rims and the bridge are dimensioned so that the nose-encircling edge is spaced upwardly from the conventional nose-pad means of the prescription eyeglasses. The construction is also provided with right and left elongated temples, each pivotably fitted and extending generally rearwardly from a corresponding side of the lens frame.

In accordance with the present invention it is preferred that the lens frame be free of any rearwardly-extending panels along a lower portion of the lens rims. It is also preferred that each temple comprise an inner, generally concave surface portion facing towards the opposing temple, the concavity shaped and dimensioned to receive the temples of a variety of prescription eyeglasses when the sunglasses are fitted over the prescription eyewear of the user. In one form, the concavity of the inner surface portion of the sunglasses temples is more pronounced adjacent the pivot point with the lens frame, but may also include a concavity at the rearward extremity of each temple.

Other features and advantages of the design and construction of the sunglasses in accordance with the present invention will be apparent from the following description and the drawing.

THE DRAWING

FIG. 6 is a cross-sectional view of a portion of the sunglasses construction shown in FIGS. 1–5, taken along the line 6—6 in FIG. 1.

FIG. 7 is a cross-sectional view of a portion of the sunglasses construction shown in FIGS. 1–5, taken along the line 7—7 in FIG. 1.

FIG. 8 is an inside view of the right temple of the sunglasses construction shown in FIGS. 1–5.

FIG. 9 is a cross-sectional view of the right temple of the sunglasses construction taken along the line 9—9 in FIG. 8.

FIG. 10 is a cross-sectional view of the right temple of the sunglasses construction taken along the line 10—10 in FIG. 8.

Figure 13:
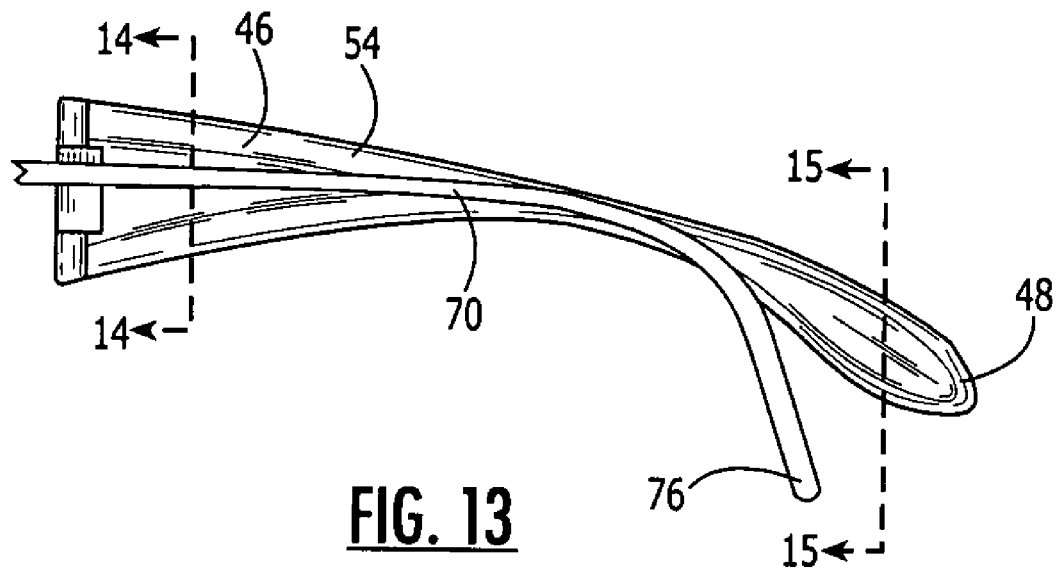
FIG. 13 is an inside view of the combination of the right temple of the sunglasses and the right temple of the prescription eyewear.
Figure 14:
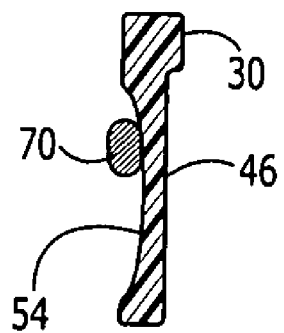
Figure 15:
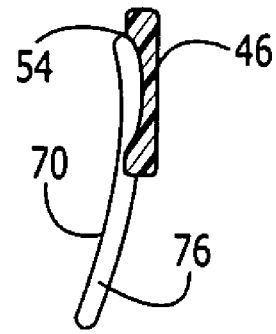

FIGS. 14 and 15 are cross-sectional elevations taken along the respective lines 14—14 and 15—15 in FIG. 13, illustrating the combination of the sunglasses and prescription eyewear temples.

DETAILED DESCRIPTION

The novel design and construction of sunglasses adapted to fit over prescription eyeglasses will initially be described with reference to FIGS. 1–5.

The construction of the sunglasses according to this invention is referred to generally with reference numeral 10. The sunglasses 10 include a lens frame 12 having opposing front and rear faces (FIGS. 1 and 2 respectively), a right encircling rim 14 and a left encircling rim 16. A right sunglasses lens 18 is fitted in the right rim 14 and a left lens 20 is fitted in the left rim 16. A bridge 22 extends between the rims 14, 16; in accordance with the present invention and as particularly shown in FIGS. 1 and 2, the rims 14, 16 extend upwardly below the bridge 22 and meet at a nose-encircling edge 24. Preferably, the lens rims 14, 16 and the bridge 22 are dimensioned so that the nose-encircling edge 24 is spaced from the conventional nose-pad means of prescription eyeglasses being worn by a user, when the sunglasses 10 are fitted over the prescription eyewear. This feature is described in greater detail below with reference to FIGS. 11 and 12. To further facilitate use of the nose-pad means associated with the prescription eyewear of the user, the nose-encircling edge 24 is free of any nose-pad surfaces.

Figure 1:
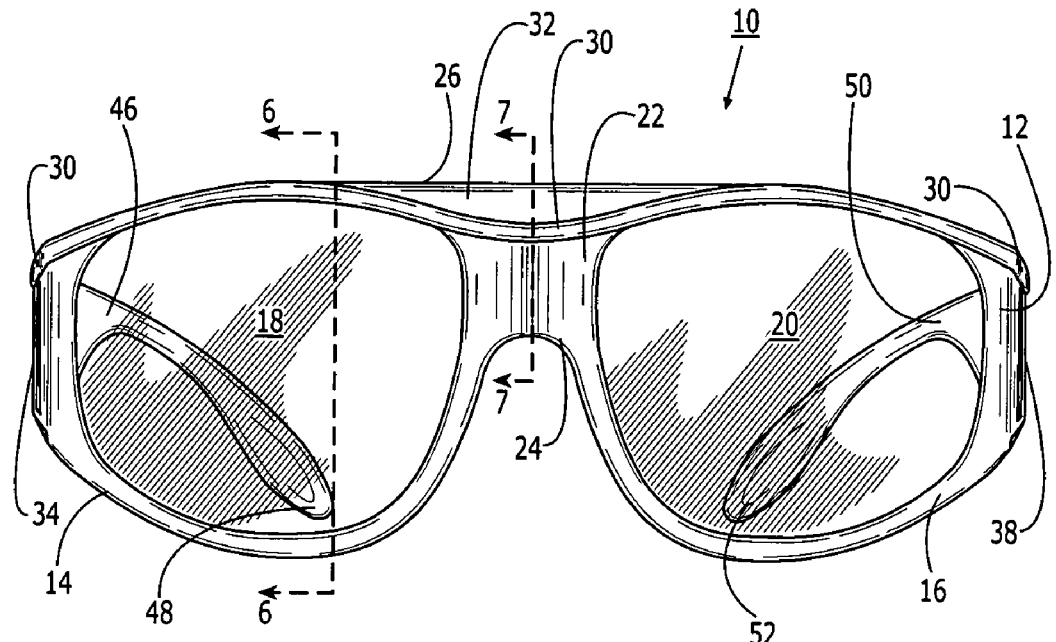
FIG. 1 is a front elevation of a sunglasses construction in accordance with the present invention.
Figure 2:
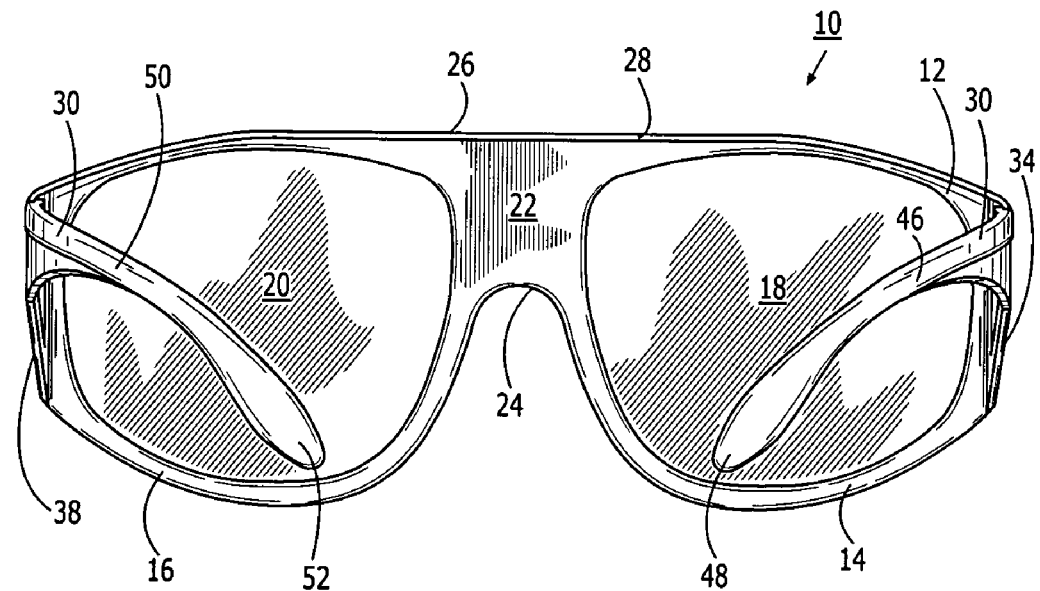
FIG. 2 is a rear elevation of the sunglasses construction shown in FIG. 1.
Figure 3:
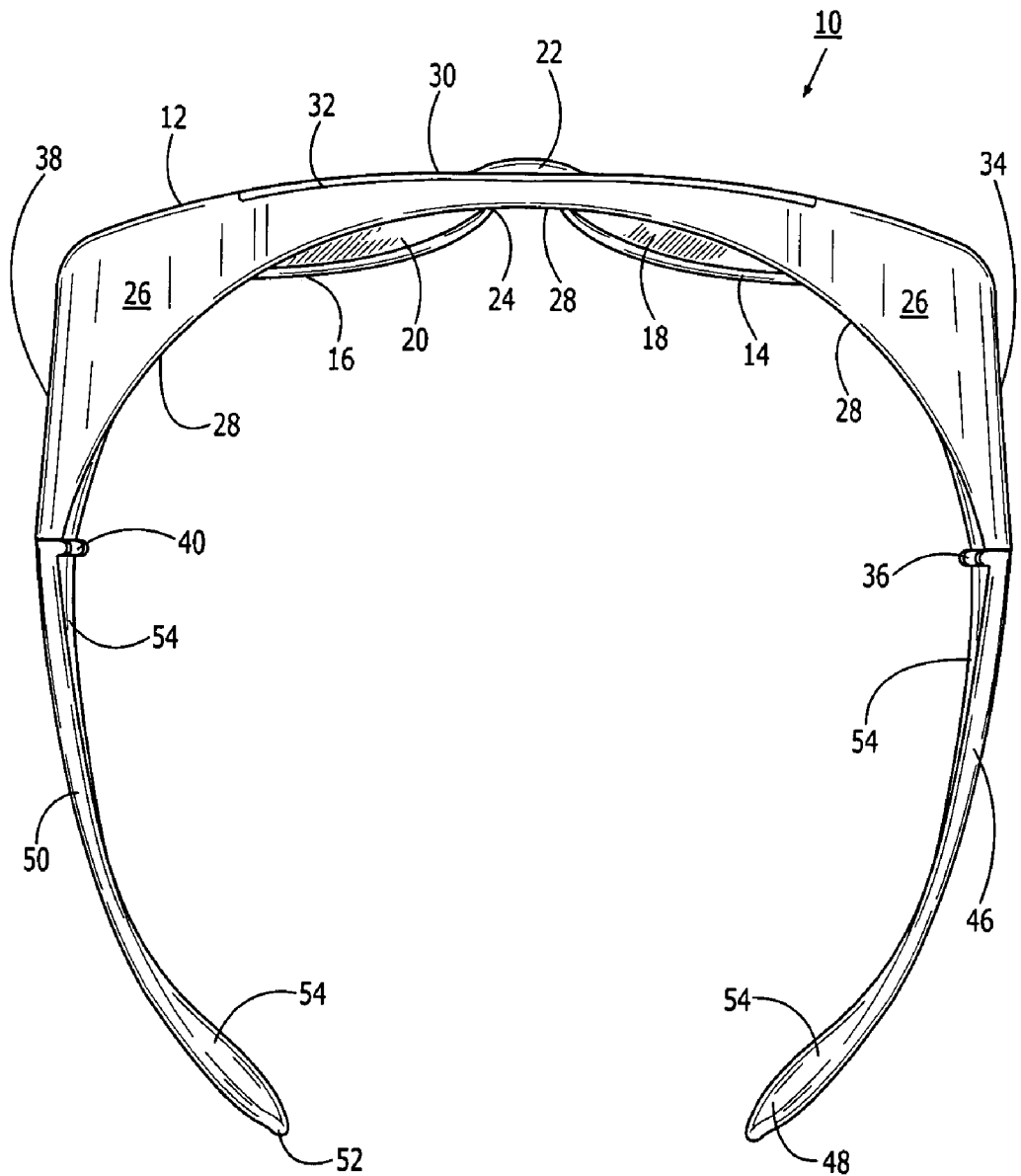
FIG. 3 is a top view of the sunglasses construction shown in FIGS. 1 and 2.

The lens frame 12 further includes a light-blocking upper panel 26 which extends generally horizontally and rearwardly from the upper portion of the frame 12 (note FIG. 3). The periphery of the light-blocking panel 26 is defined by a curved edge 28 which is adapted to provide a generally universal fit about the forehead of most users.

Referring again to FIG. 1, the lens frame 12 may also include a sloping decorative element 30 designed to oppose the upward nose-encircling edge 24, with a slight recess 32 between the horizontal light-blocking plate 26 and the decorative element 30.

Figure 4:
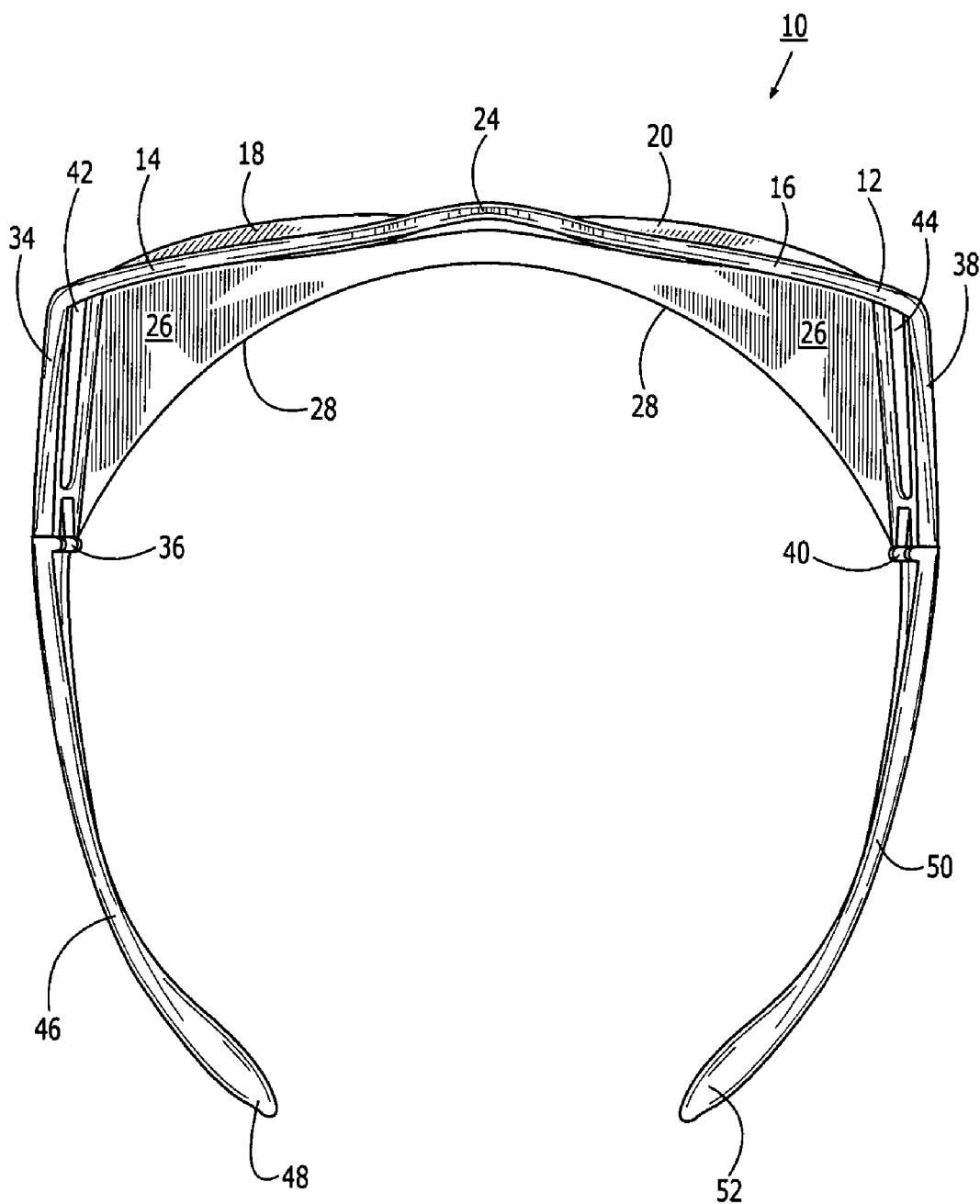
FIG. 4 is a bottom view of the sunglasses construction shown in FIGS. 1–3.
Figure 5:
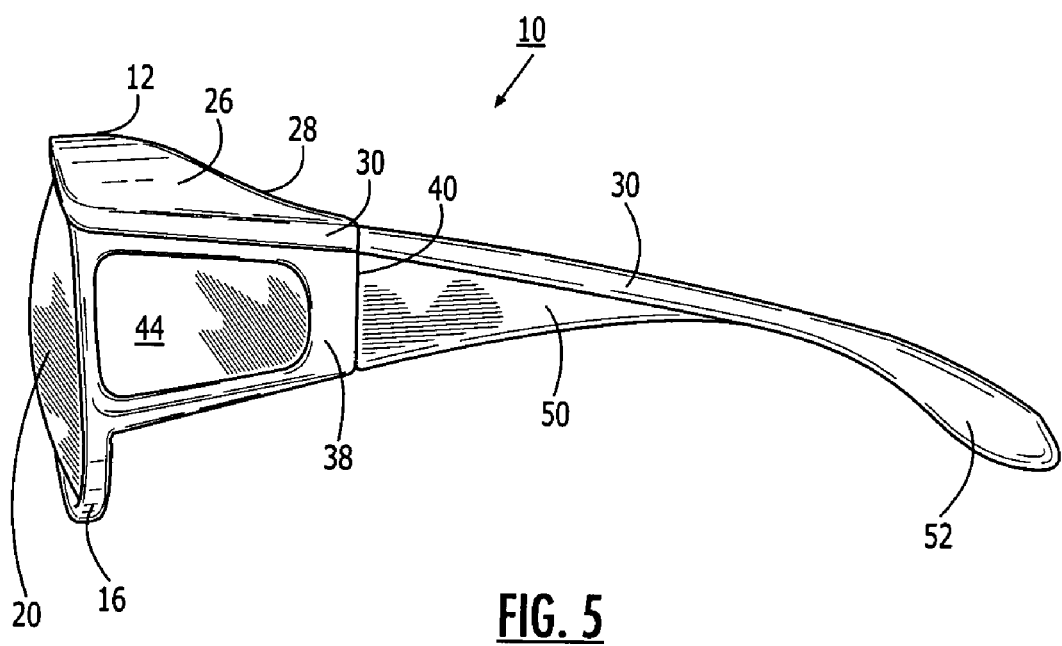
FIG. 5 is a left side view of the sunglasses construction shown in FIGS. 1–4.

As best seen in FIGS. 4 and 5, the lens frame 12 includes a right side panel 34 extending vertically and rearwardly from the right rim 14 to a right pivot hinge 36; likewise, the lens frame 12 includes a left side panel 38 which extends vertically and rearwardly from the left rim 16 to a left pivot hinge 40. Right and left side lens 42, 44 may be fitted into corresponding right and left side panels 34, 38 (note FIG. 5).

The sunglasses construction 10 further includes a right temple 46 extending from the right pivot hinge 36 to an extremity 48, and a left temple 50 extends from the left pivot hinge 40 to a left-temple extremity 52. Both temples 46, 50 are conventionally curved along a central portion to fit about the respective right and left ear of the user.

Further details of the novel sunglasses construction 10 will now be described with reference to FIGS. 6–10.

FIG. 6 illustrates a cross section of the right lens rim 14, the right lens 18 and the light-blocking upper panel 26. It will be observed that the rearward portion of the lens rim 14 is free of any rearwardly-extending panels; this feature is particularly useful in permitting the sunglasses 10 to be fitted over a wide variety of prescription eyewear of different sizes, because there is no lower obstruction to the rims of the conventional prescription eyewear.

Another feature of the construction of the sunglasses 10 will now be described with reference to FIGS. 8–10.

In FIG. 8, the inside surface of the right temple 46 is provided with a concave portion 54. Preferably, the concavity 54 is more pronounced in the forward portion of the temple 46 adjacent the pivot hinge 36. This concavity is shown in the cross section of FIG. 9. Further, however, the extremity 48 of the temple 46 is provided with a slight concavity 54 as well. It will of course be understood that an identical construction is provided on the inside surface of the left temple 50 and the corresponding extremity 52.

The manner in which the sunglasses 10 are adapted to fit over prescription eyeglasses having conventional nose-pad means and eyeglasses temples will now be described with reference to FIGS. 11–15.

Figure 11:
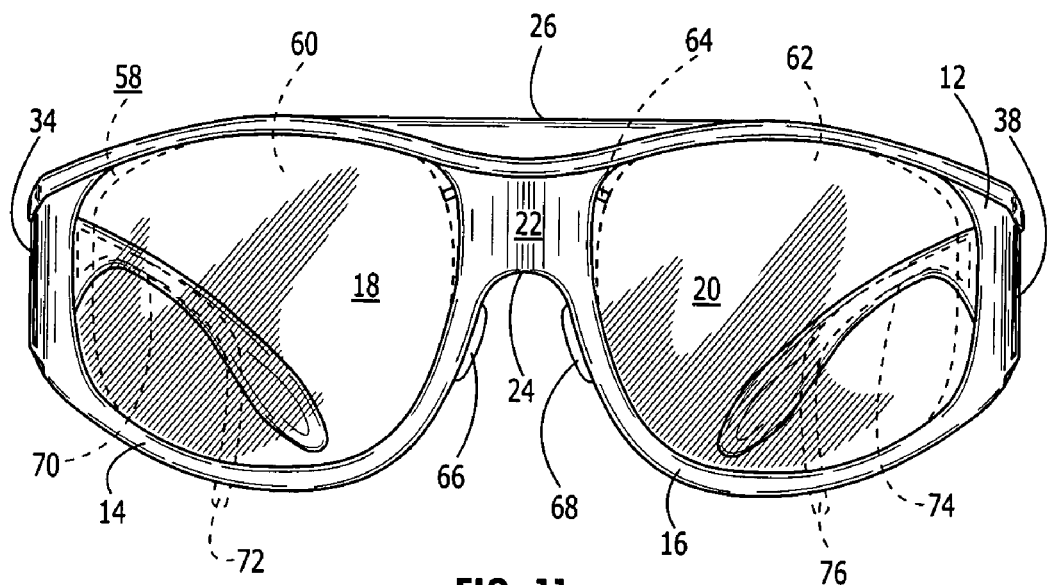
FIG. 11 is a front elevation like that in FIG. 1, illustrating the manner in which the sunglasses construction is fitted over a conventional pair of eyeglasses.
Figure 12:
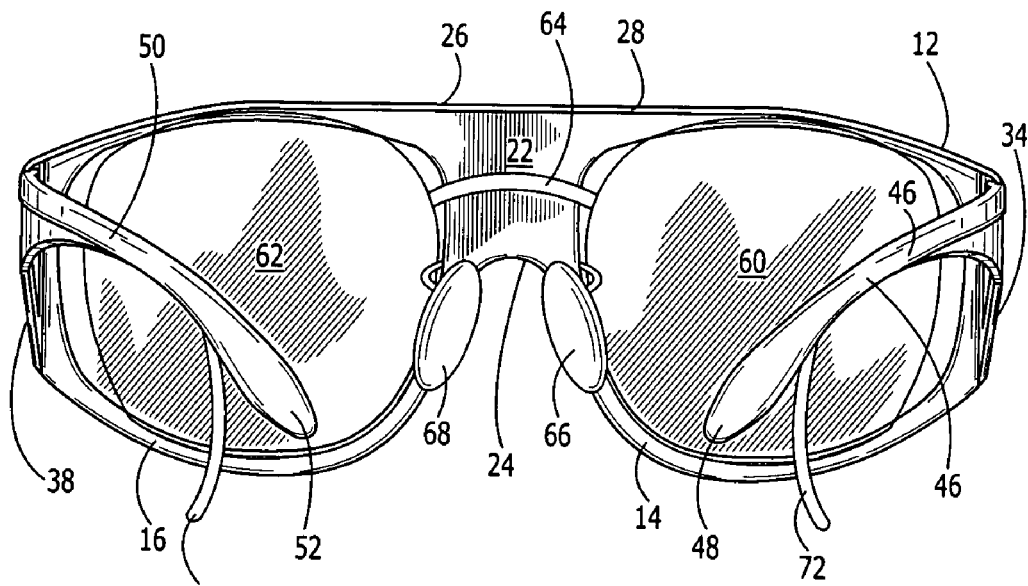
FIG. 12 is a rear elevation of the sunglasses-prescription eyewear combination shown in FIG. 11.

A representative pair of prescription eyeglasses 58 is used by way of example is illustrated in FIGS. 11 and 12. The pair of prescription eyeglasses 58 include right and left lenses 60 and 62 supported together by a bridge 64 and having opposing right and left nose pads 66, 68. The pair of eyeglasses 58 further includes a right temple 70 having a rearward extremity 72, and a left temple 74 having a rearward extremity 76. Typically, the shape and dimensions of the temples of prescription eyeglasses over which the sunglasses 10 are fitted will not correspond to the shape and dimension of the temples 46, 50 of the sunglasses. By way of example, note that the temple extremities 72, 76 of the prescription eyeglasses 58 in FIGS. 11 and 12 are illustrated as extending well below the respective right and left extremities 48, 52 of the sunglasses 10. However, the concavity 54 along the inside surface of each of the right and left temples 46, 50 of the sunglasses 10 are shaped to facilitate the fitting of the sunglasses 10 about a wide variety of temple dimensions and designs for the prescription eyewear over which the sunglasses 10 are fitted, as is illustrated in FIGS. 13–15. The use of the relatively straight, rearwardly-extending temple extremities 48, 52 for the sunglasses 10 together with the corresponding concavity 54 in those extremities also permits a wide variety of prescription eyewear to be used together with the sunglasses 10.

Further, as is illustrated in FIG. 12, the avoidance of a rearwardly-extending panel along the lower portion of the lens rims 14, 16 in the lens frame 12 of the sunglasses 10 also permits a wide variety of prescription eyewear to be fitted along the rear face of the sunglasses 10 without obstruction. While the pair of prescription eyewear 58 shown in FIGS. 11 and 12 incorporates a rimless design quite popular today, it will be appreciated by those skilled in the art that thick-rimmed prescription eyewear which may extend level with or below the corresponding lens rims 14, 16 of the sunglasses 10 can still be used with the sunglasses without any interference.

While a preferred embodiment of the design and construction of the sunglasses 10 has been described above and is shown in FIGS. 1–15, it will be appreciated by those skilled in the art that various modifications may be made in the design and construction of the sunglasses 10 without departing from the spirit and scope of the present invention.

What is claimed is:

1. A construction for sunglasses adapted and dimensioned to fit over prescription eyewear having conventional nose-pad means and eyeglasses temples, the sunglasses construction comprising:

a lens frame having opposing front and rear faces and right and left lens rims each defining respective lens openings, the lens frame further including a bridge between upper portions of the lens rims and a nose-encircling edge below the bridge;

right and left lens each supported by the corresponding lens rim in the respective opening;

elongated right and left sunglasses temples, each sunglasses temple pivotably fitted to and extending generally rearwardly from a corresponding side of the lens frame; and wherein the lens rims and the bridge are free of any nose pads and are dimensioned so that the nose-encircling edge is spaced from the conventional nose pads of the prescription eyeglasses and is spaced from a user's nose when worn by the user.

2. The sunglasses construction recited in claim 1, wherein the lens frame is free of any rearwardly-extending panels along a lower portion of the lens rims.

3. A construction for sunglasses adapted and dimensioned to fit over prescription eyewear having conventional nose-pad means and eyeglasses temples, the sunglasses construction comprising:

a lens frame having opposing front and rear faces and right and left lens rims each defining respective lens openings, the lens frame further including a bridge between upper portions of the lens rims and a nose-encircling edge below the bridge;

right and left lens each supported by the corresponding lens rim in the respective opening;

elongated right and left sunglasses temples, each sunglasses temple pivotably fitted to and extending generally rearwardly from a corresponding side of the lens frame;

the lens rims and the bridge are dimensioned so that the nose-encircling edge is spaced from the conventional nose pads of the prescription eyeglasses when worn by a user; and wherein the lens frame further comprises a light-blocking upper panel extending rearwardly from the lens frame above the bridge.

4. A construction for sunglasses adapted and dimensioned to fit over prescription eyewear having conventional nose-pad means and eyeglasses temples, the sunglasses construction comprising:

a lens frame having opposing front and rear faces and right and left lens rims each defining respective lens openings, the lens frame further including a bridge between upper portions of the lens rims and a nose-encircling edge below the bridge;

right and left lens each supported by the corresponding lens rims in the respective opening;

elongated right and left sunglasses, temples, each sunglasses temple pivotably fitted to and extending generally rearwardly from a corresponding side of the lens frame;

the lens rims and the bridge are dimensioned so that the nose-encircling edge is spaced from the conventional nose pads of the prescription eyeglasses when worn by a user; and wherein each temple comprises an inner, generally concave surface portion facing toward the opposing temple, the concavity thereof shaped and dimensioned to receive therein the temples of a variety of the prescription eyewear.

5. The sunglasses construction recited in claim 4 further comprising:

a pivot between each temple and the lens frame; and wherein the concavity of the inner surface portion of each temple is more pronounced adjacent the pivot.

6. The sunglasses construction recited in claim 4 wherein each temple comprises a central portion which is substantially thinner than a first portion adjacent the lens frame, the central portion dimensioned to pass across an ear of the user when in use.

7. The sunglasses construction recited in claim 4 wherein each temple comprises a rearward-extending extremity having a concave inner surface.

8. In combination:

a pair of prescription eyeglasses having right and left lens, a bridge supporting the lens, right and left nose pads each in fixed relation to the corresponding lens, and right and left temples each pivotably joined at one end adjacent a side of the corresponding lens;

a sunglasses lens frame and right and left sunglasses lens rims each defining respective sunglasses lens openings, each sunglasses lens rim having an upper portion and a lower portion with a sunglasses bridge between the upper portions thereof, the sunglasses front lens frame and the sunglasses rims being dimensioned to fit over the prescription eyeglasses;

right and left sunglasses lens each supported by the corresponding sunglasses lens rim in the respective opening;

a light-blocking upper panel extending rearwardly from the upper portion of the sunglasses lens rims and the sunglasses bridge, the light-blocking upper panel being curved to generally conform to the forehead of a wearer; and wherein the sunglasses lens frame is free of any rearwardly-extending panel along the lower portion of the sunglasses lens rims and includes a nose-encircling edge below the sunglasses bridge, the sunglasses lens rims and the sunglasses bridge being dimensioned so that the nose-encircling edge is free of, and is spaced outwardly from the nose-pads of the prescription eyeglasses.

9. The combination recited in claim 8 further comprising:

elongated right and left sunglasses temples, each sunglasses temple fitted at a pivot to a corresponding sunglasses lens rim and extending generally rearwardly from the rearwardly from the face of the sunglasses frame; and an inner, generally concave surface portion along each sunglasses temple facing toward the opposing temple, the concavity thereof shaped and dimensioned to receive therein at least a portion of the temples of the prescription eyeglasses.

10. The combination recited in claim 9 wherein the concavity of the inner surface portion of each temple is more pronounced adjacent the pivot.

11. A construction for sunglasses adapted and dimensioned to fit over prescription eyewear, the construction comprising:

a lens frame having opposing front and rear faces and right and left lens rims each defining respective lens openings, the lens frame further including a bridge between upper portions of the lens rims;

right and left lenses each supported by the corresponding lens rim in the respective opening;

elongated right and left sunglasses temples, each sunglasses temple fitted at a pivot to and extending generally rearwardly from a corresponding side of the lens frame; and an inner, generally concave surface portion along each temple facing towards the opposing temple, the concavity thereof shaped and dimensioned to receive therein the temples of a variety of prescription eyewear.

12. The sunglasses construction recited in claim 11 wherein the concavity of the inner surface portion is more pronounced adjacent the pivot.

13. The sunglasses construction recited in claim 12 wherein the lens frame further comprises a nose-encircling edge below the bridge, the lens rim and the bridge being dimensioned so that the nose-encircling edge is spaced from the conventional nose pads of prescription eyewear when worn by a user.

14. The sunglasses construction recited in claim 13 further comprising:

a light-blocking upper panel extending rearwardly from the lens frame above the bridge; and wherein the lens frame is free of any rearwardly-extending panels along a lower portion of the lens rims.

* * * * *